(12) United States Patent
Komatsu

(10) Patent No.: US 7,080,003 B2
(45) Date of Patent: Jul. 18, 2006

(54) SPEECH INTERACTIVE INTERFACE UNIT

(75) Inventor: Eiji Komatsu, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 680 days.

(21) Appl. No.: 10/000,445

(22) Filed: Dec. 4, 2001

(65) Prior Publication Data

US 2002/0193990 A1     Dec. 19, 2002

(30) Foreign Application Priority Data

Jun. 18, 2001     (JP)     ............... 2001/183420

(51) Int. Cl.
   *G06F 17/20*     (2006.01)
(52) U.S. Cl. .......................... 704/3; 704/10
(58) Field of Classification Search ................ 704/254, 704/9, 270
   See application file for complete search history.

(56) References Cited

U.S. PATENT DOCUMENTS

| | | | |
|---|---|---|---|
| 6,094,635 A * | 7/2000 | Scholz et al. ............... | 704/270 |
| 6,510,411 B1 * | 1/2003 | Norton et al. ............... | 704/254 |
| 6,560,576 B1 * | 5/2003 | Cohen et al. ............... | 704/270 |

FOREIGN PATENT DOCUMENTS

| | | |
|---|---|---|
| JP | 07093353 | 4/1995 |
| JP | 08077274 | 3/1996 |
| JP | 11149297 | 6/1999 |

* cited by examiner

*Primary Examiner*—Tālivaldis Ivars Šmits
*Assistant Examiner*—Minerva Rivero
(74) *Attorney, Agent, or Firm*—Valentine Francos & Whitt, PLLC

(57) ABSTRACT

An interactive speech interface unit includes speech recognizer for recognizing input speech of user utterance and converting the recognized input speech into a character string; an input statement analyzer means for analyzing the character string and converting the analyzed character string into semantic representation; an interactive controller for controlling flow of an interactive status and accessing an application; an output statement generator for generating an intermediate language to be output to the user; a speech generator for converting the intermediate language into speech and outputting the speech; and an application interface for accessing the application using the semantic representation output from the interactive controller, wherein the interactive controller puts series of interactive sequences having calling relations together in a plurality of interactive tasks in association with relations and includes an interactive task hierarchical data base for storing the interactive tasks in a hierarchical structure.

14 Claims, 17 Drawing Sheets

CONFIGURATION OF AN INTERACTIVE SPEECH INTERFACE UNIT
ACCORDING TO A FIRST EMBODIMENT

CONFIGURATION OF AN INTERACTIVE SPEECH INTERFACE UNIT

ACCORDING TO A FIRST EMBODIMENT

EXAMPLE OF INTERACTIVE TASK HIERARCHICAL DATA BASE interactive task

CONFIGURATION OF AN INTERACTIVE TASK

EXAMPLE OF AN UPPER AND LOWER CHAIN OF
AN INTERACTIVE TASK FETCHED FROM DATA BASE

FIG. 5

```
interactive sequence name
{
  interactive status name: (describe an identifier of an interactive status)
  {
    interactive procedure:
```

All sets of "event" "action" "interactive status to be transitive next" which are used in the interactive status in concern are described. For one event, describe not less than one action, one next interactive status.

Event comprises the following (1) to (5).
(1) input statement from a user (describe in semantic representation)
(2) results returned from a sub-interactive sequence
(3) results returned from a calling application
(4) decision results of various conditions (time out of a response wait from user, etc.)
(5) no event (in case of unconditionally performing an action and a transition)

Action comprises the following (1) to (4).
(1) deliver output statement to user (describe in semantic representation) to output statement generation part
(2) call sub-interactive sequence
(3) deliver semantic representation for executing an application to an application interface sequence part
(4) no action (perform only a status transition without doing anything)

```
  }
  (description of another interactive status)
}
```

CONFIGURATION OF AN INTERACTIVE SEQUENCE

FIG. 6

```
interactive sequence name: information retrieval sequence
{
   interactive status name: information retrieval results wait status
   interactive procedure:
   {
      if (event "elapse of 5 seconds from the start of retrieval" occurred){
          action "output of [retrieval is under execution] to a user" is executed;
          }
      if (event "the number of retrieval results is 0" occurred){
          transit to an interactive status "the number of retrieval results being too small";
          }
      else if (event "the number of retrieval results ranging from 1 to 9" occurred) {
          transit to an interactive status "retrieval results being obtained ";
          }
      else if (event "the number of retrieval results being not less than 10" occurred) {
              action "the number of retrieval results being too large" is executed;
              if (event [acknowledgement by a user] occurred){
                   transit to an interactive status "retrieval results being obtained";
              }
      }
      else{
                   transit to an interactive status "retrieval results being obtained";
      }
   }

(description of another interactive status)
}
```

EXAMPLE OF AN INTERACTIVE SEQUENCE

FIG. 7 interactive task of interactive task hierarchical data base information retrieval interactive task

```
modified portion of an upper interactive task:
application operation interactive sequence{
event / action / next interactive status: PROC_001
} information retrieval interactive sequence
{
interactive status name: STATUS_101
event / action / next interactive status: PROC_101
interactive status name: STATUS_102
event / action / next interactive status: PROC_102
}
``` restaurant retrieval interactive task

```
modified portion of upper interactive task:
information retrieval interactive sequence
{
interactive status name: STATUS_101
event/action/next interactive status: PROC_103
} interactive sequence:
restaurant retrieval interactive sequence
{
interactive status name: STATUS_201
event / action / next interactive status: PROC_201
interactive status name: STATUS_202
event / action / next interactive status: PROC_202
}
``` interactive sequence stored in an interactive sequence storage part

```
application operation interactive sequence
{
interactive status name: initial status
event / action / next interactive status: PROC_001
} information retrieval interactive sequence
{
interactive status name: STATUS_101
event/action/next interactive status: PROC_103
interactive status name: STATUS_102
event / action / next interactive status: PROC_102
} restaurant retrieval interactive sequence
{
interactive status name: STATUS_201
event / action / next interactive status: PROC_201
interactive status name: STATUS_202
event / action / next interactive status: PROC_202
}
``` upper interactive sequence is described in normal face, and lower interactive sequence is described in boldface.

EXAMPLE OF STORAGE OF AN INTERACTIVE SEQUENCE
IN AN INTERACTIVE SEQUENCE STORAGE PART

PROCESSING FLOW BY AN INTERACTIVE CONTROLLER

CONFIGURATION OF AN INTERACTIVE SPEECH INTERFACE UNIT

ACCORDING TO A SECOND EMBODIMENT

In case of rewriting "Chinese restaurant retrieval interactive task"
to "French restaurant retrieval interactive task"
when executing "information retrieval interactive task"

EXAMPLE OF REWRITE OF AN INTERACTIVE TASK CHAIN

FIG. 11

```
interactive sequence name: information retrieval interactive sequence
{
interactive status name: initial status
interactive procedure:
  {
    action "output of [what do you retrieve?]" is executed;
    if(event "a user inputs [Chinese restaurant]" occurred){
        action "rewrite to an interactive task including Chinese restaurant" is executed;
        action "call Chinese restaurant retrieval interactive sequence" is executed;
    }
    else if (event "a user inputs [Japanese restaurant]" occurred){
        action "rewrite to an interactive task chain including Japanese restaurant" is executed;
        action "call Japanese restaurant retrieval interactive sequence" is executed;
    }
    else if (event "a user inputs [French restaurant]" occurred){
        action "rewrite to an interactive task chain including French restaurant" is executed;
        action "call French restaurant retrieval interactive sequence" is executed;
    }
    (description of another interactive procedure)
  }

(description of another interactive status)
}
```

EXAMPLE OF AN INTERACTIVE SEQUENCE

CONFIGURATION OF AN INTERACTIVE SPEECH INTERFACE UNIT
ACCORDING TO A THIRD EMBODIMENT

FIG. 13

```
interactive sequence name
{
  interactive status name: (describe an identifier of an interactive status)
    {
      interactive procedure
```

All sets of "event" "action" "interactive status to be transitive next" which are used in the interactive status in concern are described. For one event, describe not less than one action, one next interactive status.

Event comprises the following (1) to (5).
(1) input statement from a user (describe in semantic representation)
(2) results returned from a sub-interactive sequence
(3) results returned from a calling application
(4) decision results of various conditions (time out of a response wait from user, etc.)
(5) a keyword in a keyword definition data base Action comprises the following (1) to (4).
(1) deliver output statement to user (describe in semantic representation) to output statements generation part
(2) call sub-interactive sequence
(3) deliver semantic representation for executing an application to an application interface sequence part
(4) no action (perform only a status transition without doing anything)

```
    }
  (description of another interactive status)
}
```

CONFIGURATION OF
A USER CATALOG INTERACTIVE SEQUENCE

FIG. 14

(perform a dialog and "shift to retrieval end status")
input by user: catalog of user interactive sequence
response by system: input event name
input by user: no event
response of system: input action
input by user: no action
response of system: input next interactive status
input by user: end status
response of system: interactive sequence is cataloged ※: in a status such as the end status where the user can not actually attach a bookmark at that status, it can be used as a reserved word.

EXAMPLE (1) OF USER INTERACTIVE SEQUENCE CATALOGED DIALOG

FIG.15

Interactive sequence name: (omitted)
{
  interactive status name: retrieval end status
  interactive procedure:
  {
      action "end" is executed;
      (source interactive procedure)
  }

(description of another interactive status)
}

INTERACTIVE SEQUENCE CATALOGED IN FIG. 14

FIG. 16

(interactive status: "retrieval end status")
input by user: keyword catalog
response by system: input keyword
input by user: end
response of system: the keyword is cataloged
 do you set another keyword?
input by user: end of keyword setting (keyword setting ended)

EXAMPLE OF KEYWORD CATALOGED DIALOG

FIG. 17

(interactive status: "retrieval end status")
input by user: bookmark catalog
response by system: input bookmark name
input by user: end
response of system: the bookmark is cataloged (bookmark setting ended)

EXAMPLE OF BOOKMARK CATALOGED DIALOG

FIG. 18 input by user: user interactive sequence catalog
response by system: input event name
input by user: event specification
response of system: please input event name
input by user: end
response of system: input next interactive status
input by user: end status
response of system: interactive sequence is cataloged

EXAMPLE (2) OF USER INTERACTIVE SEQUENCE CATALOGED DIALOG

FIG. 19

```
interactive sequence name: information retrieval interactive sequence
{
  interactive status name: retrieval end status
  interactive procedure:
  {
        if(event "keyword [end]is inputted" occurred){
            action "end" is executed
        }
        ....
  }
  (description of another interactive status)
```

INTERACTIVE SEQUENCE CATALOGED IN FIG. 18

FIG. 20

(system executes retrieval)
response by system: retrieval results are read out
    ... ... ...
    system will end
(system ended automatically)

DIALOG USING USER INTERACTIVE SEQUENCE IN FIG. 15

FIG. 21

(system executes retrieval)
response by system: retrieval results are read out
    ... ... ...
input by user: end
response by system: system will end (system ended automatically)

DIALOG USING USER INTERACTIVE SEQUENCE IN FIG. 19

FIG. 22
PRIOR ART

```
input by user: I want to retrieve.
response by system: What do you want to retrieve?
input by user: Chinese restaurant.
response by system: Which area do you want to retrieve?
input by user: Shinjuku.
(system executes information retrieval)
response by system: 62 cases match your inquiry.
response by system: What do you want to do?
input by user: At east entrance.
response by system: 4 cases match your inquiry
                    May I read out?
input by user: read out names and places
response by system: Rairai-ken, Shinjuku 1-chome, ...(omitted)
```

EXAMPLE OF APPLICATION OPERATION ACCORDING TO A
CONVENTIONAL INTERACTIVE SPEECH

SPEECH INTERACTIVE INTERFACE UNIT

BACKGROUND OF THE INVENTION

1. Field of the Invention

The invention relates to an interactive speech interface unit for operating applications using an interactive speech.

2. Description of the Related Art

A speech interface unit for operating applications by speech has been recently devised. FIG. 22 shows an example of the operation of an application using a conventional interactive speech. Although an actual input by a user and a response by a system are performed by a sound or speech, a statement comprised of the mixture of kanji and kana is used hereafter for the convenience of an explanation.

In the interactive speech, flow of dialog need be controlled so as to perform the dialog smoothly. The flow of dialog means a manner of response by a system to the input by a user wherein when a system performs appropriate responses, an efficient interactive speech function can be realized.

An interactive sequence means data which the system holds therein for the purpose of controlling the flow of dialog. The interactive sequence is a network describing statuses of the system in the dialog, an event (results of analysis of a user utterance, results of data, statuses of various flags), an action for operating something (feedback from the system to a user, application operations, setting of various flags) and a next transitive status.

FIG. 23 is an example of a conventional interactive sequence (an interactive sequence as disclosed in a second reference, described later). Characters encircled by squares represent statuses. When an event occurs at every interactive status, an action to be executed by a system relative to the event occurred and a status to be transitive after execution of the action are described. The interactive sequence is first started from an initial status and ended when it transits to an end status. Further, with the interactive sequence, in some status, that status is once stored and another interactive sequence is executed, then an operation can be restarted from the stored status of a source interactive sequence upon termination of the interactive sequence like a subroutine call in a program language.

In this case, an execution extending from a starting status to an ending status of the interactive sequence corresponding to the subroutine call becomes one action of the source interactive sequence.

The method of controlling flow of dialog is changed depending on an application operated by interactive speech and a field which the application handles. There are following references relating to an invention for facilitating easiness of conversion (hereinafter referred to as field conversion property) when the application or the field is changed.

First Reference: Japanese Patent Laid-Open Publication No. 8-77274

Second Reference: Japanese Patent Laid-Open Publication No. 11-149297

In the first reference, a module referred to as "interactive sequence switching part" selects a corresponding one interactive sequence pattern from interactive sequence patterns stored in an interactive sequence storage part in response to kinds of service which is selected by a user. A field conversion property is enhanced by replacing an interactive sequence pattern to be stored in the interactive sequence storage part.

In the second reference, an interactive sequence is divided into two layers of interactive sequences wherein an upper layer is for a general part and a lower layer is for a field dependent part, and wherein the lower layer interactive sequence is subjected to a subroutine call from the upper layer interactive sequence. When the lower layer interactive sequence is replaced by another interactive sequence, the field conversion property is enhanced.

However, in the technique as disclosed in the first reference, interactive sequences are replaceable as a whole at every field, application so that the efficiency of the preparation of the interactive sequence is not achieved. As a result, it has been necessary to develop interactive sequences at every corresponding applications and fields.

Further, although the field conversion property is enhanced by re-preparing only the lower layer interactive sequences in the invention as disclosed in the second reference, there is a possibility that the modification of the lower layer affects the upper layer, and hence the field conversion property is not always sufficient.

Still further, in either reference, there is no means for a user to customize a flow of dialog.

SUMMARY OF THE INVENTION

It is an object of the invention to provide an interactive speech interface unit which is high in field conversion property and is easily customized by a user.

To achieve the above object, the interactive speech interface unit of the invention comprises speech recognition means for recognizing input speech of user utterance and converting the recognized input speech into a character string, input statement analysis means for analyzing the character string and converting the analyzed character string into semantic representation; interactive control means for controlling flow of an interactive status and accessing an application, output statement generation means for generating an intermediate language to be outputted to the user, speech generation means for converting the intermediate language into speech and outputting the speech, and application interface means for accessing the application using the semantic representation outputted from the interactive control means, wherein the interactive control means puts series of interactive sequences having calling relations together in a plurality of interactive tasks in association with relations and includes an interactive task hierarchical data base for storing the interactive tasks in a hierarchical structure.

BRIEF DESCRIPTION OF THE DRAWINGS

FIG. 5 is a view showing a configuration of an interactive sequence;

FIG. 6 is a view showing an example of an interactive sequence;

FIG. 7 is a view showing an example of storage of an interactive sequence in an interactive sequence storage part;

FIG. 11 is a view showing an example of an interactive sequence;

FIG. 13 is a view showing a configuration of a user catalog interactive sequence;

FIG. 14 is a view showing an example (1) of a user interactive sequence cataloged dialog;

FIG. 15 is a view showing an interactive sequence cataloged in FIG. 14;

FIG. 16 is a view showing an example of a keyword cataloged dialog;

FIG. 17 is a view showing an example of a bookmark cataloged dialog;

FIG. 18 is a view showing an example (2) of a user interactive sequence cataloged dialog;

FIG. 19 is a view showing an interactive sequence cataloged in FIG. 18;

FIG. 20 is a view showing a dialog using the user interactive sequence in FIG. 15;

FIG. 21 is a view showing a dialog using the user interactive sequence in FIG. 19;

FIG. 22 is an example of an application operation according to a conventional interactive speech;

PREFERED ENBODIMENT OF THE INVENTION

First Embodiment

Figure 1:
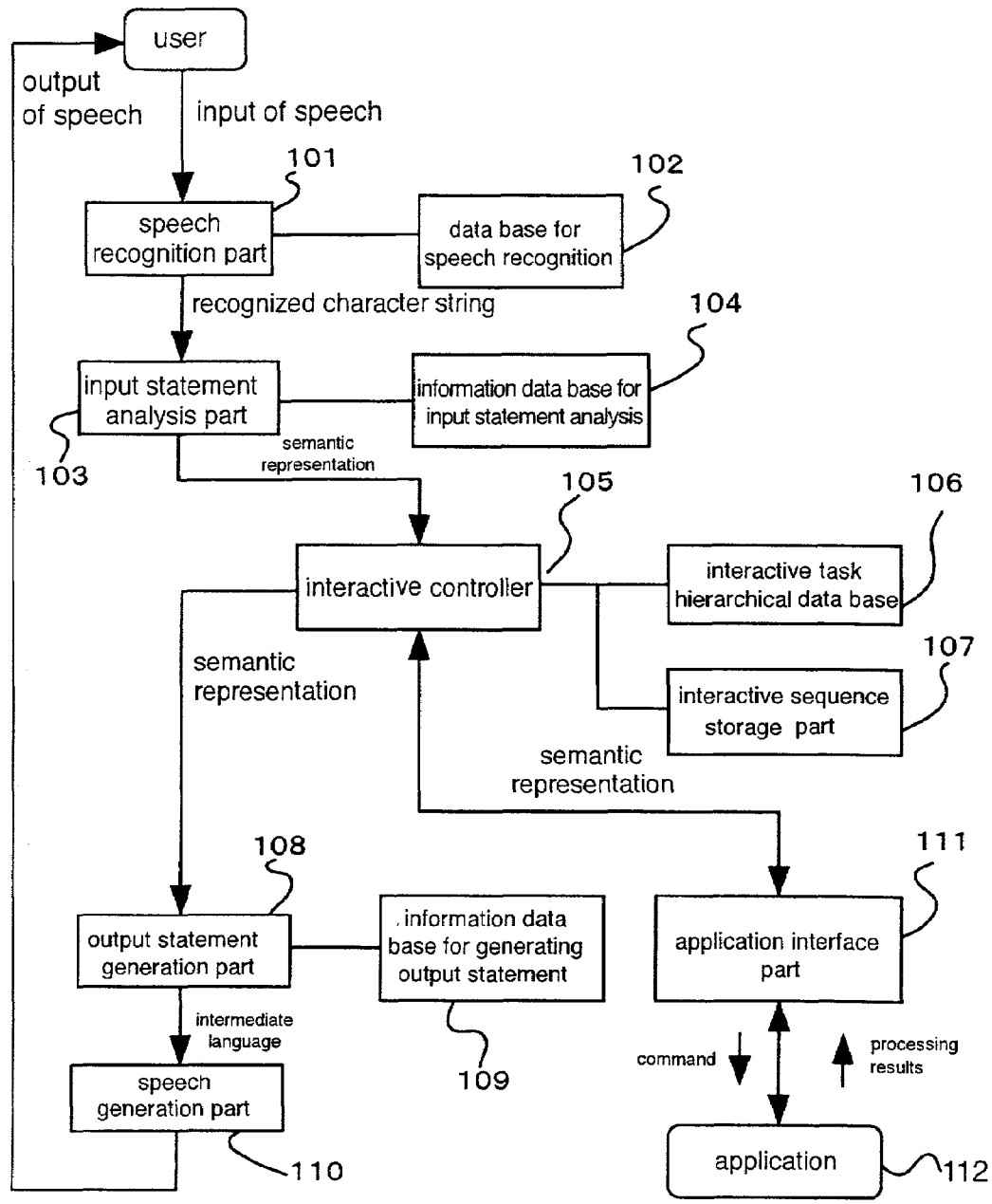
FIG. 1 is a view showing a configuration of an interactive speech interface unit according to a first embodiment of the invention.

FIG. 1 is a view showing an interactive speech interface unit according to a first embodiment of the invention. For technical terms according to the invention, a bundle of a series of interactive sequences having a plurality of calling relations is referred to as "interactive tasks". An interactive sequence which is called from other interactive sequences is referred to as a "sub-interactive sequence".

A reference numeral 101 is a speech recognition part for recognizing input speech of a user and converting it into a character string, 102 is a database for speech recognition for storing information to be used for speech recognition, 103 is an input statement analysis part for analyzing the recognized character string and converting it into semantic representation, 104 is an information database for input statement analysis for storing information to be used for input statement analysis, 105 is an interactive controller for controlling the flow of interactive status to execute a dialog with the user and access an application via an application interface part 111, described later, and 106 is an interactive task hierarchical database for storing interactive tasks in a hierarchical structure.

Figure 2:
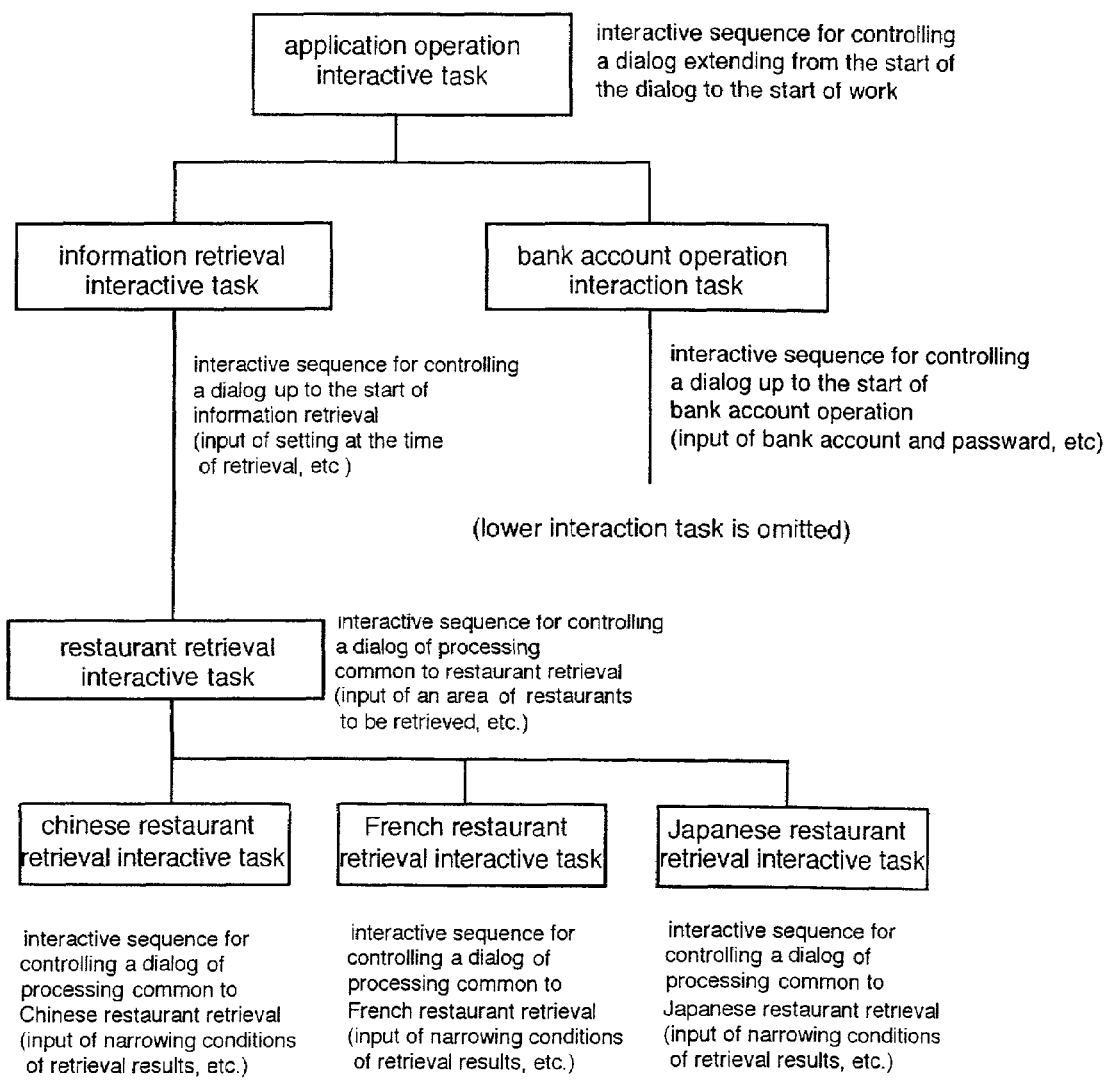
FIG. 2 is a view showing a configuration of an interactive task hierarchical data base.

FIG. 2 shows an example of the interactive task hierarchical database. Although one upper interactive task is illustrated in the database in FIG. 2, it is permitted that a plurality of interactive sequences are present as the upper interactive task.

Figure 3:
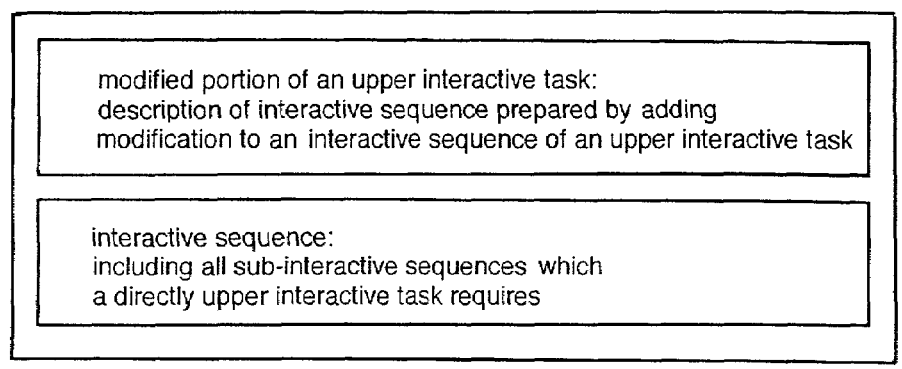
FIG. 3 is a view showing a configuration of an interactive task.

FIG. 3 shows a configuration of an interactive task. The interactive task comprises a series of interactive sequences and an interactive sequence prepared by modifying an upper interactive sequence. For example, if a modified version of an interactive procedure of "application operation interactive task" in an initial status is added to "Chinese restaurant retrieval interactive task", it is possible to output "Chinese restaurant retrieval" to the user by speech when starting a dialog.

In the database, the lower interactive task is prepared to include all the sub-interactive sequences which are needed for the upper interactive task. Even if there are a plurality of lower interactive tasks, all the sub-interactive sequences of the upper interactive task need be included in the respective lower interactive tasks.

Figure 4:
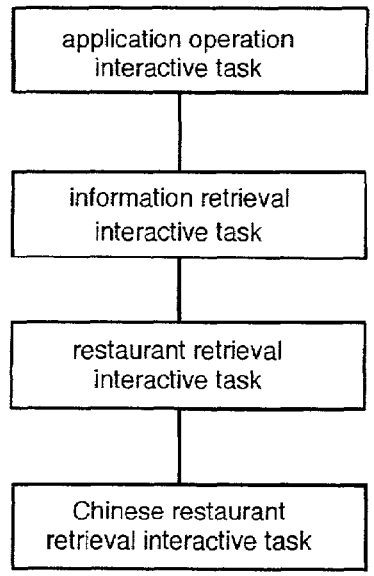
FIG. 4 is a view showing an example of an upper/lower interactive task chain fetched from the data base.

FIG. 4 shows an example of an upper/lower task chain fetched from the interactive hierarchical database shown in FIG. 2.

A reference numeral 107 in FIG. 1 is an interactive sequence storage part storing interactive sequences included in the interactive task chain fetched from the interactive hierarchical database. With data of the interactive hierarchical database, the interactive task chain as shown in FIG. 4 is first fetched, then it is stored in the interactive sequence storage part while reflecting "modified portion of an interactive sequence of the upper interactive task" shown in FIG. 3.

FIG. 5 is a configuration of the interactive sequence. It is assumed that an interactive status name is unique as a whole of the interactive task hierarchy. Further, it is assumed that an interactive status at the transition destination is always present, and the interactive status is always transitive to an end status from any interactive status by applying an appropriate event sequences. At least one interactive procedure corresponds to one interactive status. Although the interactive procedure is written in a programming language and the like, it is written in Japanese language for convenience of the following explanation.

FIG. 6 shows an example of the interactive sequence.

A reference numeral 108 is an output statement generation part for generating an intermediate language to be outputted to a user, 109 is information data base for generating an output statement for use in generating the output statement, 110 is a speech synthesis or generation part for converting the intermediate language into speech, 111 is an application interface part for accessing an application 112 using semantic representation delivered from the interactive controller 105.

The interactive controller 105 fetches an upper/lower chain of the interactive task from the interactive task hierarchical data base 106, converting it into an executable interactive sequence and storing the executable interactive sequence in an interactive sequence storage part 107. It is previously specified as to which interactive sequence chain is fetched when the system is activated.

FIG. 7 is an example of storage of an interactive sequence. A left side in FIG. 7 is an interactive sequence before it is stored in the interactive sequence storage part 107, and a right side in FIG. 7 is an interactive sequence after it was stored in the interactive sequence storage part 107. The portions emphasized and described in a boldface correspond to a lower interactive sequence while the portions described in a normal face correspond to an upper interactive sequence. There is "information retrieval interactive sequence" at the modified portion of the upper task of the interactive sequence "restaurant retrieval interactive sequence" before it is stored in the interactive sequence storage part 107. Accordingly, an interactive procedure PROC_101 of the upper "information retrieval interactive sequence" in an interactive status STATUS 101 is replaced by a lower PROC 103.

Figure 8:
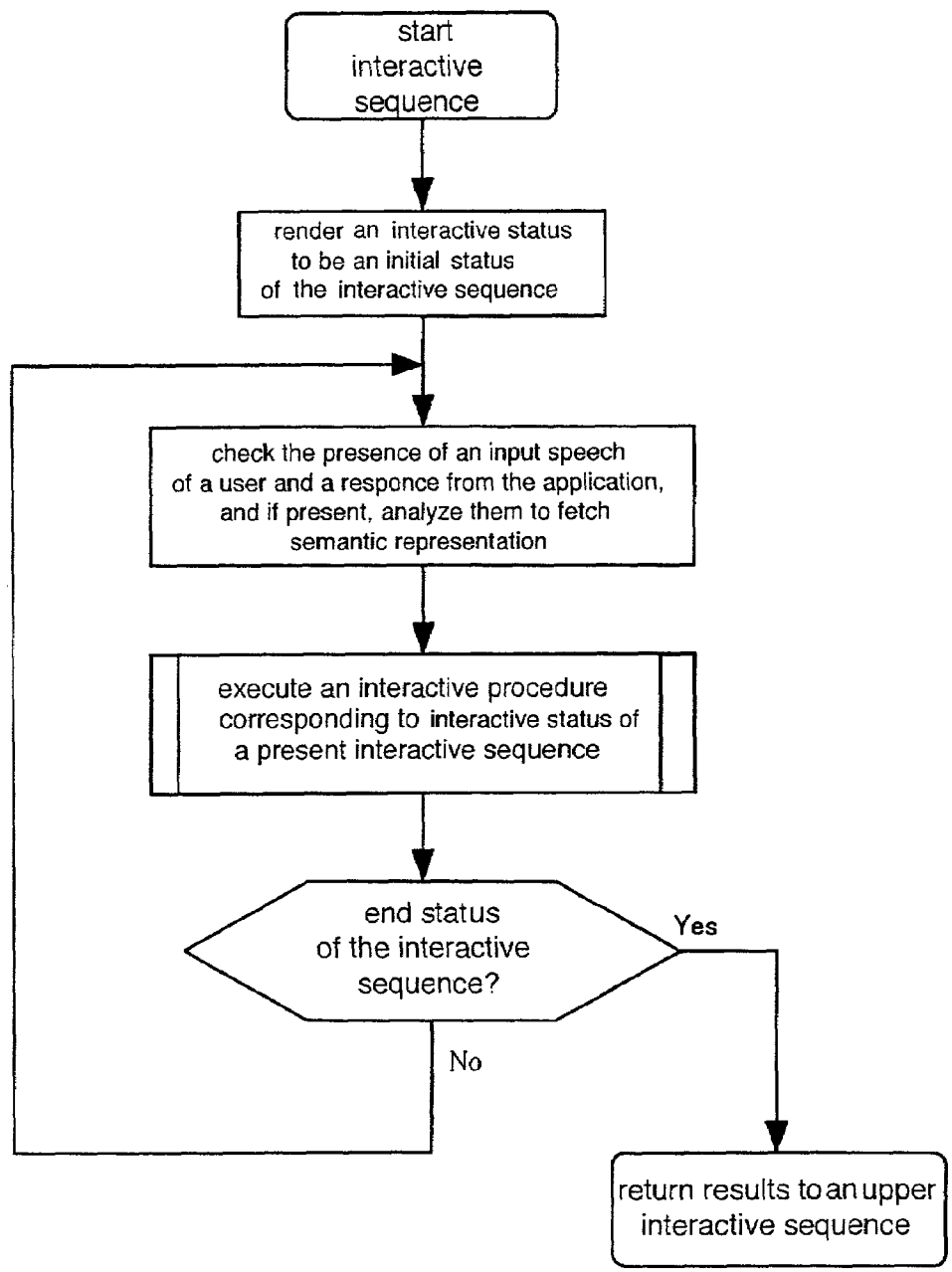
FIG. 8 is a view showing processing flow by an interactive controller.

FIG. 8 shows a processing flow by the interactive controller 105. The interactive status is first initialized. Thereafter, an interactive procedure which is applied to the interactive status is executed, and the interactive status is rendered transitive while performing a dialog between a user and an application. Every time one interactive procedure -is executed, an input from the user, a response from the application, and an event such as various conditions and the like are checked. An output to the user is executed as an action during the interactive procedure. If a sub-interactive sequence is activated during the interactive procedure, the control is shifted to the sub-interactive sequence so that the sub-interactive sequence is executed in accordance with the processing flow shown in FIG. 8.

When the input speech by the use is fetched, firstly the speech recognition part 101 recognizes user utterance and coverts it into a character string. Then the input statement analysis part 103 analyzes the character string outputted from the speech recognition part 101, converts it into semantic representation used by the interactive controller 105 and delivers it to the interactive controller 105. If an output is needed during the execution of the interactive procedure, the semantic representation is supplied to the output statement generation part 108, then it is converted into an intermediate language. Thereafter, the speech generation part 110 converts the intermediate language into speech and outputs it to the user. If an access to the application is needed during the interactive procedure, it is performed via the application interface part 111. Even in this case, using the semantic representation, the application interface part 111 converts the semantic representation while the application 112 receives a command from the application interface parts 111 and outputs processing results to the application interface part 111.

Second Embodiment

Figure 9:
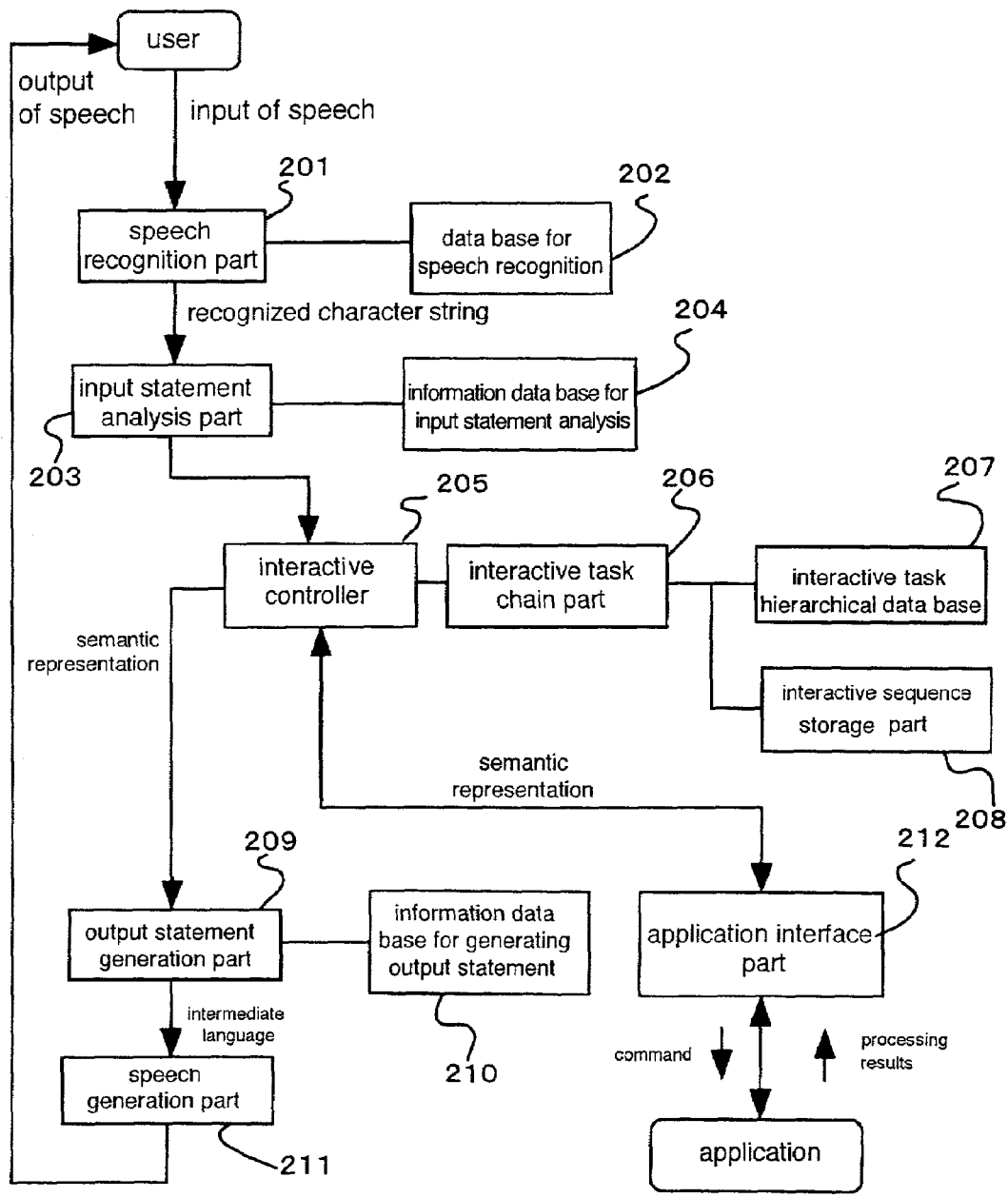
FIG. 9 is a view showing a configuration of an interactive speech interface unit according to a second embodiment of the invention.

FIG. 9 is a view showing a configuration of an interactive speech interface unit according to a second embodiment of the invention. The second embodiment is different from the first embodiment in respect of the addition of an interactive task chain part 206. The interactive task chain part 206 fetches an interactive upper/lower chain of an interactive task, from an interactive task hierarchical data base 207, during the execution of the dialog, in the same manner as shown in FIG. 4 of the first embodiment of the invention, and rewrites in part.

Only the operation of the interactive task chain part 206 shown in FIG. 9 is different from the operation of the first embodiment.

First of all, in the same manner as the first embodiment, an interactive controller 205 fetches an interactive task chain from the interactive task hierarchical data base 207, converts it into an executable interactive sequence and stores the executable interactive sequence in an interactive sequence storage part 208. It is previously specified as to which interactive sequence chain is fetched when the system is activated. It is different from the first embodiment in that another interactive task chain is fetched from the interactive task hierarchy during the execution of the dialog so that a part of the interactive sequence stored in the interactive sequence storage part 107 is rewritable.

Figure 10:
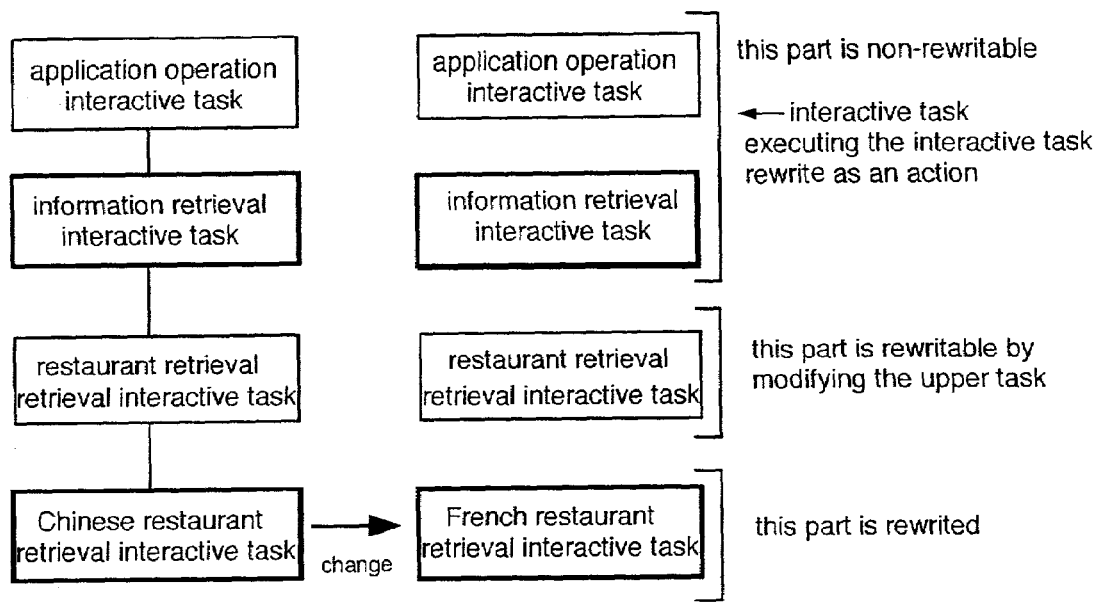
FIG. 10 is a view showing an example of rewrite of an interactive task chain.

FIG. 10 is an example of rewriting of the interactive task chain. Further, it is possible to rewrite the interactive sequence by describing a processing to restore another interactive task chain in the interactive sequence storage part during the execution of the dialog. The rewriting is described as an action of the interactive procedure. However, it is assumed that the change of an interactive sequence which is under execution and the change of an interactive sequence which causes the change of the portion of an interactive sequence of a calling part is not permitted.

FIG. 11 is an example of description of an interactive sequence for causing rewriting the interactive sequence. An action which is placed first in an initial status is executed when a control is shifted from the application operation interactive sequence to the information retrieval interactive sequence so that the interactive controller supplies a semantic representation that "what do you retrieve?" to the output statement generation part 209. Thereafter, a speech is outputted to the user through the same processing as the first embodiment.

When the user inputs a speech of "French food" and the like, a semantic representation of "French restaurant" is supplied from the input statement analysis part 203 to the interactive controller 205 through the same processing as the first embodiment. A processing to normalize an input of "France" to a representation which is described in the interactive sequence such as "French restaurant" is effected by the input statement analysis part 203. In FIG. 11, a processing is continued after rewriting an interactive sequence which is specified by the action of the rewiring interactive sequence. When rewriting, if the modified portion of the interactive sequence under execution is included in the lower interactive task, the interactive sequence under execution is rewritten, and hence it is assumed that the rewriting using such an interactive task is not described.

Third Embodiment

Figure 12:
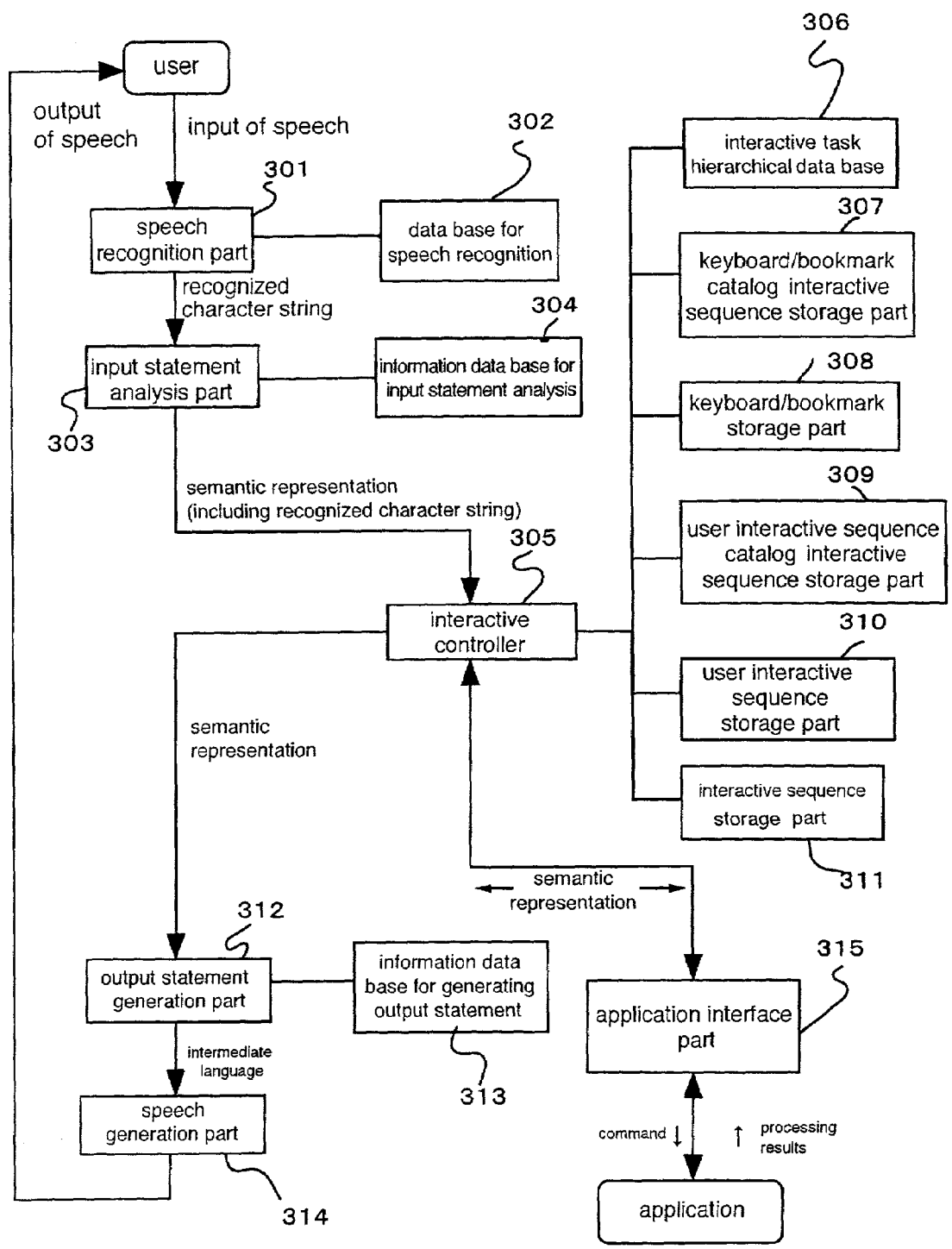
FIG. 12 is a view showing a configuration of an interactive speech interface unit according to a third embodiment of the invention.
Figure 23:
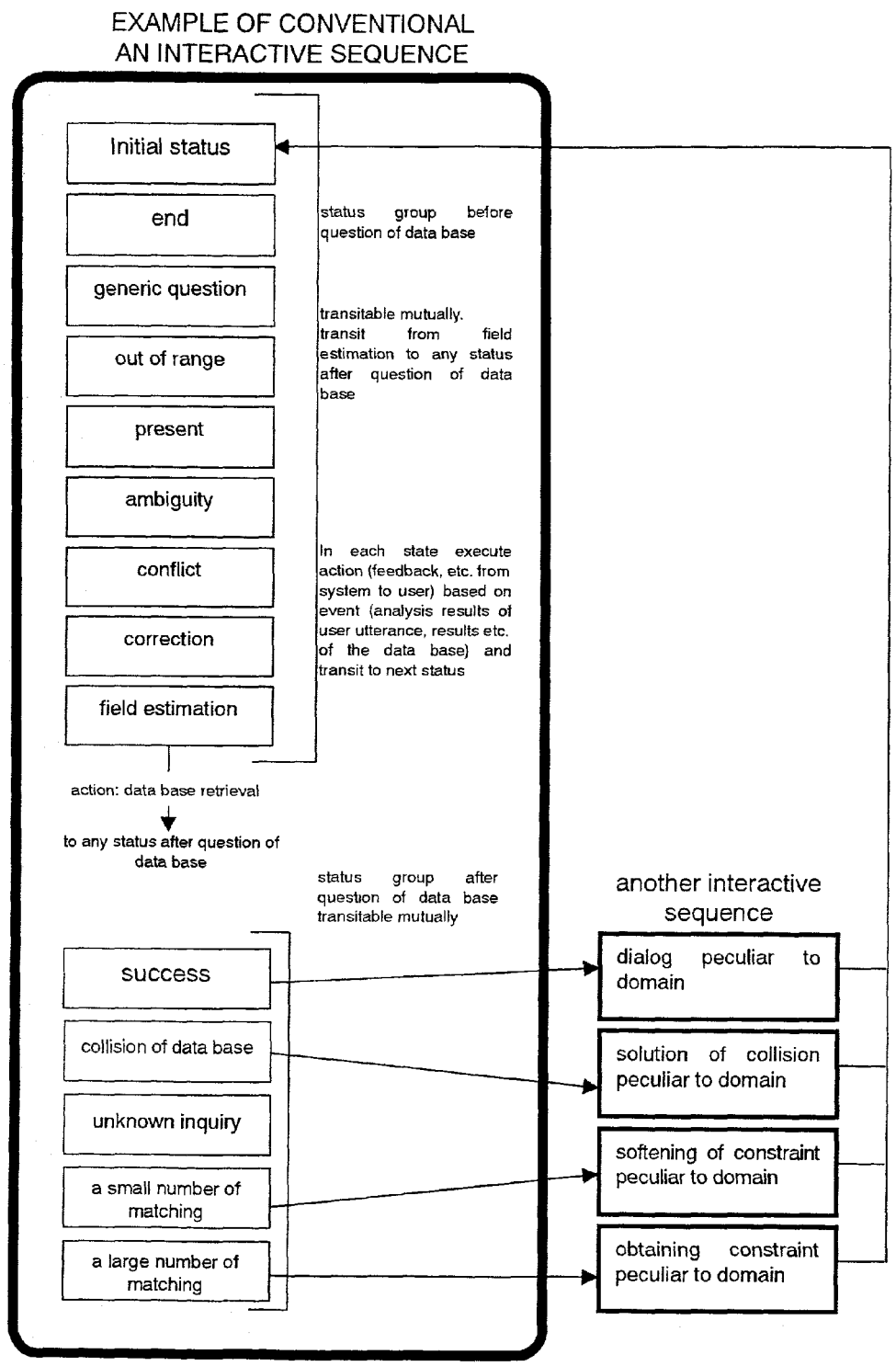
FIG. 23 is a view showing an example of a conventional interactive sequence.

FIG. 12 is a view showing a configuration of an interactive speech interface unit according to a third embodiment of the invention. The third embodiment of the invention is different from the first embodiment of the invention in respect of constituents 307, 308, 309 and 310. According to the third embodiment, a user can catalog an interactive sequence. A character string which the speech recognition part recognized as well as semantic representation are delivered from the input statement analysis part 303 to the interactive controller 305. Further, when the keyword is cataloged, the interactive controller 305 can use the speech recognition character string as an event as it is. The bookmark is a name attached by a user for an interactive status and it is used for specifying the interactive status of a destination of transition when the interactive sequence is cataloged by the user.

A reference numeral 307 is a keyword/bookmark catalog interactive sequence storage part for storing an interactive sequence for use in cataloging a keyword and a bookmark, 308 is a keyword/bookmark storage part for storing the keyword and the bookmark specified by the user, 309 is a user interactive sequence catalog interactive sequence storage part for storing an interactive sequence for use in cataloging the user interactive sequence, and 310 is a user interactive sequence storage part for storing the user interactive sequence.

FIG. 13 is a configuration of the user catalog interactive sequence used in the third embodiment. The third embodiment is different from the first embodiment in that a keyword can be used as an event.

The operation of the third embodiment which is different from that of the first embodiment is now described. First of all, an operation for cataloging a user interactive sequence is described. FIG. 14 is an example (1) of a catalog of a user interactive sequence. The user moves to an interactive status where an interactive procedure is to be added. When moved to the interactive status, if there occurs a transition to another status, an interactive sequence stored in the user interactive sequence catalog interactive sequence storage part is activated by a previously specified input. The user specifies an event, an action and an interactive status to be transitive next.

For the event, events used in that status are read out by the system, and one of the events is to be selected. In addition to that, "no-event (unconditional)" and a keyword (setting manner is described later) can be used.

For the action, actions capable of being used in that status are read out by the system, and one of the actions is to be selected. In addition to that, "no-action (nothing is done)" can be selected.

A next transition status is specified by use of a bookmark cataloged by a user (descriptive manner is described later). The user interactive sequence is stored in the user interactive sequence storage part 310. FIG. 15 is a user interactive sequence cataloged in FIG. 14. The keyword and the bookmark are cataloged in the following manner.

(1) Since the keyword and the bookmark are cataloged in correspondence with the interactive status, they are first moved to the interactive status so as to correspond thereto.

(2) The interactive sequence stored in the keyword/bookmark catalog interactive sequence storage part 307 is activated. A user catalogs the keyword and the bookmark in the specified manner (see FIGS. 16 and 17).

In an "end status", if transit to that status, the dialog system per se is ended, and hence the bookmark is not attached so that it is necessary that the system can prepare and specify the bookmark. Except for that, in an interactive status where the bookmark can not be attached, the system prepares the bookmark. The reference of inspection of release of the keyword and the bookmark is processed in the similar procedure. In a status such as an end status where a user can not actually attach the bookmark in that status, it can be used as a reserved word. The release of the bookmark is prohibited in the similar interactive status by the catalog of the user interactive sequence described later.

For the event of the user interactive sequence, a cataloged keyword can be used. FIG. 18 shows an example (2) of the catalog of the user interactive sequence using the keyword. FIG. 19 is an interactive sequence cataloged in FIG. 18. It is assumed that in an interactive status where the user can not stay by the occurrence of any action, an interactive sequence capable of cataloging a status from other interactive statuses while specifying a status name is described in a user interactive sequence catalog dialog. The reference of inspection of deletion of the user interactive sequence is also processed in the similar procedure.

The operation of the interactive speech using the user interactive sequence is described next. A character string recognized by a speech recognition part 301 is added to semantic representation which is delivered from the input statement analysis part 303 to the interactive controller 305. The interactive controller 305 retrieves the keyword/bookmark storage part to check as to whether the character string attached to the semantic representation is the keyword which corresponds to the present interactive status. If cataloged, the keyword is managed as an event. If not cataloged, the semantic representation is managed as an event.

For a method of application of the interactive sequence, an interactive sequence stored in the user interactive sequence storage part 310 is first applied. If the interactive procedure to be applied is not found, an interactive sequence stored in the interactive sequence storage part 311 is applied.

Other operations are the same as those of the first embodiment. FIG. 20 is a dialog using the user interactive sequence shown in FIG. 15 and FIG. 21 is a dialog using the user interactive sequence shown in FIG. 19.

What is claimed is:

1. An interactive speech interface unit comprising:
   a speech recognizer that recognizes input speech of user utterance and converts the recognized input speech into a character string;
   an input statement analyzer that analyzes the character string and converts the analyzed character string into semantic representation;
   an interactive controller that controls flow of an interactive status and accessing an application, the interactive controller putting series of interactive sequences having calling relations together in a plurality of interactive tasks having an upper interactive task and a lower interactive task in a hierarchical structure, the interactive controller modifying one of the interactive sequences in an upper interactive task in accordance with a lower interactive task;
   an output statement generator that generates an intermediate language to be output to the user;
   a speech generator that converts the intermediate language into speech and outputs the speech;
   an application interface that accesses an application using the semantic representation output from the interactive controller; and an interactive task hierarchical database that stores the interactive tasks including the modified interactive sequence in a hierarchical structure.

2. The interactive speech interface unit according to claim 1, wherein lower interactive tasks in the hierarchical structure are prepared to include all sub-interactive sequences which are needed for an upper interactive task.

3. The interactive speech interface unit according to claim 1, further comprising an interactive task chaining part that executes an upper/lower chain of the interactive tasks during execution of a dialog and dynamically switches interactive sequences.

4. The interactive speech interface unit according to claim 1, wherein the interactive controller further comprises a keyword/bookmark catalog interactive sequence storage, a keyword/bookmark storage, a user interactive sequence catalog interactive sequence storage, and a user interactive sequence storage, whereby catalog functions of the interactive sequences by a user are added so as to change flow of a dialog by the user.

5. The interactive speech interface unit according to claim 4, wherein the interactive controller receives the semantic representation including a recognized character string from the input statement analyzer, decides whether a keyword corresponding to a present interactive status is included in the recognized character string, and adds an interactive sequence using the keyword if the keyword is included in the recognized character string.

6. The interactive speech interface unit according to claim 3, wherein the switching of the interactive sequences is implemented by describing and rewriting the interactive sequence as an action of an interactive procedure.

7. An interactive speech interface system comprising:

a speech recognition part receiving speech from a user, the speech recognition part converting the input speech into a character string;

an analysis part coupled to the speech recognition part, the analysis part analyzing the character string received from the speech recognition part and converting the received character string into a semantic representation;

an interactive task hierarchical database storing a plurality of interactive tasks each of which includes an interactive sequence in a hierarchical structure so that the interactive tasks include an upper interactive task and a lower interactive task;

an interactive sequence memory storing the interactive sequence;

an interactive controller coupled to the analysis part, the interactive task hierarchical database and the interactive sequence memory, the interactive controller providing an interactive task in response to the semantic representation, modifying the interactive sequence in the upper interactive task of the interactive task in response to the lower interactive task of the interactive task, and providing the lower interactive task with the modified interactive sequence;

an output statement generation part coupled to the interactive controller, the output statement generation part generating an intermediate language in response to the interactive task provided by the interactive controller; and a speech generator coupled to the output statement generation part, the speech generator converting the intermediate language into speech and outputting the speech.

8. The interactive speech interface system according to claim 7, further comprising a speech recognition database coupled to the speech recognition part, the speech recognition database storing information used for the speech recognition.

9. The interactive speech interface system according to claim 7, further comprising an input statement analysis database coupled to the analysis part, the input statement analysis database storing information used for the analysis of the character string.

10. The interactive speech interface system according to claim 7, further comprising an output statement analysis database coupled to the output statement generation part, the output statement analysis database storing information used for the generation of the intermediate language.

11. The interactive speech interface system according to claim 7, further comprising:

an application receiving a command and providing a result in response to a treatment of the application; and an application interface part coupled between the interactive controller and the application, the application interface part providing the command to the application in response to the semantic representation delivered from the interactive controller and converting the result provided by the application into the semantic representation.

12. The interactive speech interface system according to claim 7, further comprising an interactive task chain part coupled between the interactive controller and the interactive task hierarchical database, the interactive task chain part fetching a chain of the interactive tasks delivered from the interactive task hierarchical database and replacing the interactive tasks.

13. The interactive speech interface system according to claim 7, further comprising:

a keyword memory coupled to the interactive controller for storing a keyword; and a keyword registration interactive sequence memory coupled to the interactive controller for storing an interactive sequence for registration of the keyword.

14. The interactive speech interface system according to claim 7, further comprising:

a bookmark memory coupled to the interactive controller for storing a bookmark; and a bookmark registration interactive sequence memory coupled to the interactive controller for storing an interactive sequence for registration of the bookmark.

* * * * *